United States Patent
Henry et al.

(10) Patent No.: US 10,595,295 B2
(45) Date of Patent: Mar. 17, 2020

(54) ACCESS POINT PROXIMITY GRAPHING

(71) Applicant: Cisco Technology, Inc., San Jose, CA (US)

(72) Inventors: Jerome Henry, Pittsboro, NC (US); Robert Edgar Barton, Richmond (CA); Timothy Daniel Spiglanin, Santa Clara, CA (US); Rajesh S. Pazhyannur, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 16/024,377

(22) Filed: Jun. 29, 2018

(65) Prior Publication Data
US 2020/0008169 A1  Jan. 2, 2020

(51) Int. Cl.
| H04B 7/00 | (2006.01) |
| H04W 64/00 | (2009.01) |
| H04W 24/02 | (2009.01) |
| H04W 36/00 | (2009.01) |
| H04W 24/08 | (2009.01) |
| H04W 84/12 | (2009.01) |

(52) U.S. Cl.
CPC ......... *H04W 64/003* (2013.01); *H04W 24/02* (2013.01); *H04W 24/08* (2013.01); *H04W 36/0061* (2013.01); *H04W 84/12* (2013.01)

(58) Field of Classification Search
CPC ............. H04W 36/00; H04W 36/0016; H04W 36/0061; H04W 36/0083
USPC ........................................ 370/310, 331, 332
See application file for complete search history.

(56) References Cited

U.S. PATENT DOCUMENTS

| 7,509,131 | B2 | 3/2009 | Krumm et al. |
| 8,478,265 | B2 * | 7/2013 | Orlassino ............... H04W 48/08 455/432.1 |
| 8,982,732 | B2 | 3/2015 | Balasubarmaniyan et al. |
| 8,989,147 | B1 * | 3/2015 | Mater ..................... H04W 4/04 370/331 |
| 9,014,376 | B2 * | 4/2015 | Yao ....................... H04L 63/061 380/272 |

(Continued)

OTHER PUBLICATIONS

Massa, Dossa Mohamed., "A Framework for Usage Modeling and Anomaly Detection in Large-Scale 802.11 Networks" https://repositorio-aberto.up.pt/bitstream/10216/78777/2/34807.pdf, Apr. 2015, 140 pages, Universidade do Porto.

*Primary Examiner* — Dmitry Levitan
(74) *Attorney, Agent, or Firm* — Behmke Innovation Group LLC; James Behmke; Stephen D. LeBarron

(57) ABSTRACT

In one embodiment, a process determines how often client devices roam from a given access point (AP) to each particular neighbor AP of a plurality of neighbor APs of the given AP, and correspondingly determines a roaming distance from the given AP to each particular neighbor AP, the roaming distance being shorter for neighbor APs roamed to more often, and longer for neighbor APs roamed to less often, within a given interval. Successful but temporary roams to the plurality of neighbor APs may also be detected and removed from consideration in the roaming distance to that particular neighbor AP. The process then generates a proximity list of one or more of the neighboring APs having the shortest roaming distances, and feeds the proximity list to the given AP to cause the given AP to provide the proximity list to client devices for optimized client roaming.

20 Claims, 6 Drawing Sheets

(56) References Cited

U.S. PATENT DOCUMENTS

| | | | | |
|---|---|---|---|---|
| 9,253,693 B2* | 2/2016 | Pang | ................. | H04W 36/0083 |
| 9,615,292 B2* | 4/2017 | Kang | .................... | H04W 28/18 |
| 2008/0293405 A1* | 11/2008 | Meyer | ................... | H04W 48/18 |
| | | | | 455/432.1 |
| 2012/0149367 A1* | 6/2012 | Miranda | ............... | H04W 12/06 |
| | | | | 455/432.1 |
| 2015/0119043 A1* | 4/2015 | Gopal | .............. | H04W 36/0061 |
| | | | | 455/437 |

* cited by examiner

ACCESS POINT PROXIMITY GRAPHING

TECHNICAL FIELD

The present disclosure relates generally to computer networks, and, more particularly, to access point proximity graphing.

BACKGROUND

Wireless roaming occurs when a client device or "station" moves throughout an area with multiple access points (APs), automatically switching from a current AP, once outside its usable range, to another AP (within the same wireless network) with better signal strength. The roaming process itself consists of a "handoff" process, which, according to the well-known IEEE 802.11 standard, is generally dictated by the client device in terms of when to disconnect from one AP and then to which new AP the client device should to re-associate.

In particular, roaming paths in wireless networks (e.g., Wi-Fi) are determined by the client station, based on detected APs during scanning phases. APs can influence this scanning phase by providing a shortlist of candidate channels to scan. However, APs is using traditional methods rely on neighboring signals to build such a list. For instance, an AP may first detects neighbors using various techniques (e.g., passively scanning each channel in turn), then determines the "best neighbors" as the top n loudest neighboring APs (e.g., based on received signal strength indication, or "RSSI") heard for a given wireless network (e.g., service set identifier, "SSID"). The AP then provides that list to its wireless clients, where the clients are expected to try these loudest neighbors first when attempting to roam. Unfortunately, loudest neighbors do not always correspond to the best candidates for roaming from the client perspective.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a process determines how often client devices roam from a given access point (AP) to each particular neighbor AP of a plurality of neighbor APs of the given AP, and correspondingly determines a roaming distance from the given AP to each particular neighbor AP, the roaming distance being shorter for neighbor APs roamed to more often, and longer for neighbor APs roamed to less often, within a given interval. Successful but temporary roams to the plurality of neighbor APs may also be detected and removed from consideration in the roaming distance to that particular neighbor AP. The process then generates a proximity list of one or more of the neighboring APs having the shortest roaming distances, and feeds the proximity list to the given AP to cause the given AP to provide the proximity list to client devices for optimized client roaming.

DESCRIPTION

A computer network is a geographically distributed collection of nodes interconnected by communication links and segments for transporting data between end nodes, such as personal computers and workstations. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other.

Figure 1:
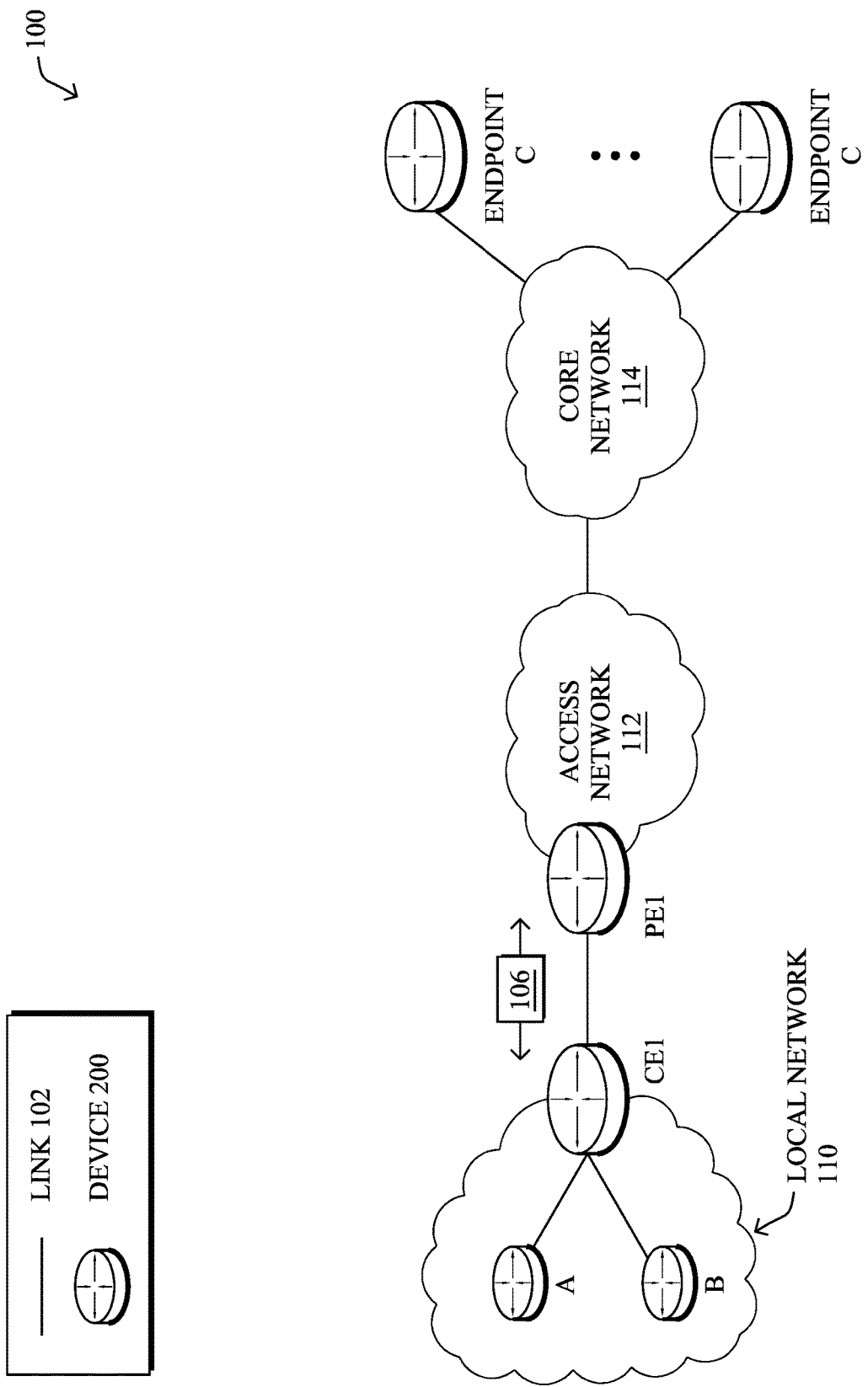
FIG. 1 illustrates an example computer network.

FIG. 1 is a schematic block diagram of an example simplified computer network 100 illustratively comprising nodes/devices 200, such as a plurality of computers, routers, servers, etc. interconnected by links and/or networks, as shown. For example, a customer edge (CE) router CE1 may interconnect devices "A" and "B" (e.g., computers or routers with computers connected to them) on a local network 110 with a provider edge (PE) router PE1 of an access network 112. In turn, access network 112 may provide local network 110 with connectivity to a core network 114, such as the Internet. From core network 114, any number of other endpoints "C" may be interconnected, such as servers, datacenters, databases, Internet of Things (IoT) networks, personal computers, workstations, and so on. For example, device A in local network 110 may be configured to access one or more remote "cloud" services via core network 114, as will be readily appreciated by those skilled in the art.

The various nodes/devices 200 may exchange data packets 106 (e.g., traffic/messages) via computer network 100 over links 102 using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. As would be appreciated, links 102 may include any number of wired and/or wireless connections between devices. For example, device A may communicate wirelessly using a WiFi™ connection, device B may be connected via a wired Ethernet connection, CE1 may communicate to PE1 wirelessly using a cellular connection or else via a hardwired connection (e.g., DSL, cable, etc.), and so on.

Those skilled in the art will understand that any number of nodes, devices, links, etc. may be used in the computer network, and that the view shown herein is for simplicity. For example, while certain devices are depicted in FIG. 1, the view shown is a simplified view of computer network 100. In other words, communication network 100 may also include any number of intermediary networking devices such as, but not limited to, routers, switches, firewalls, etc., that are not shown.

Figure 2:
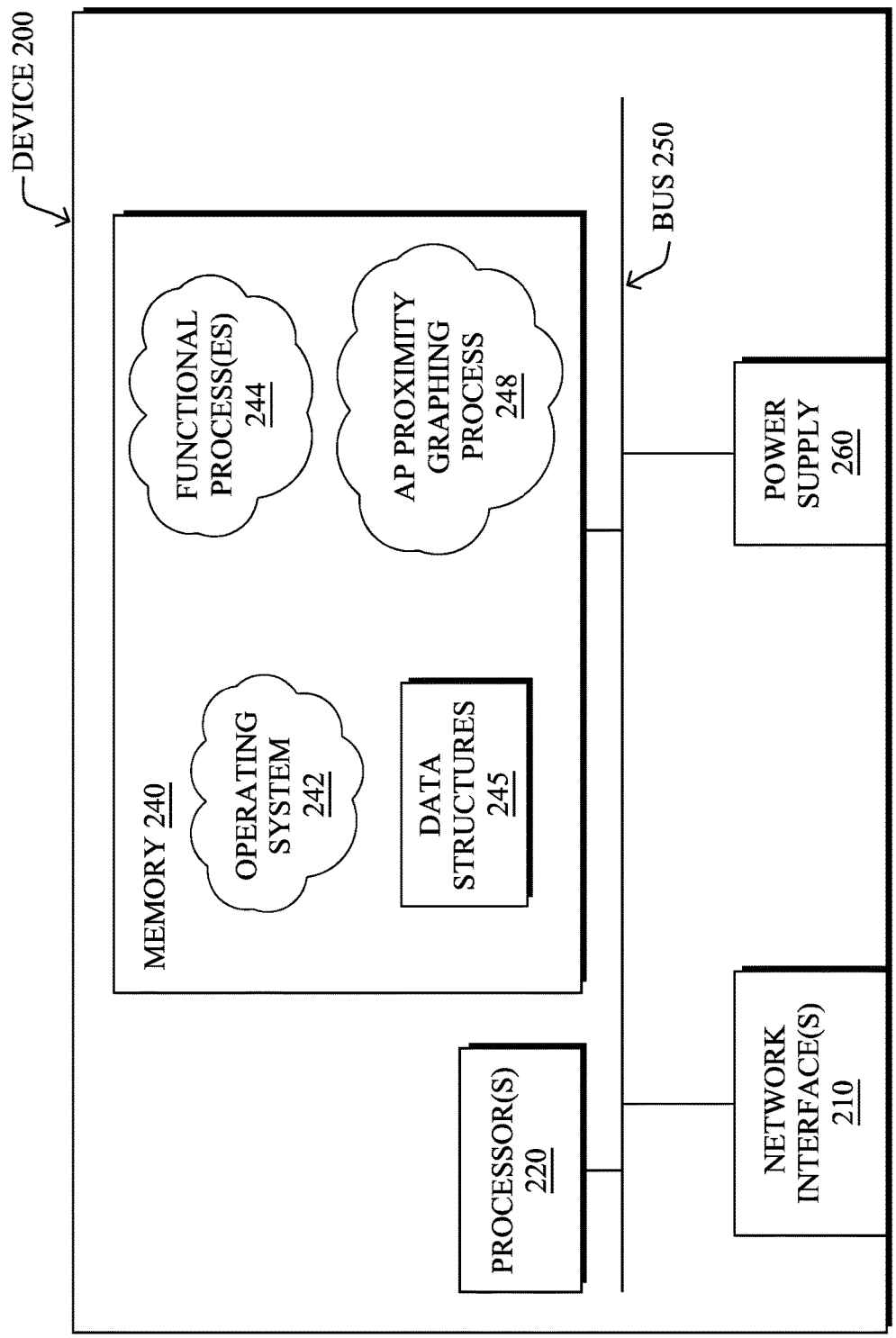
FIG. 2 illustrates an example computing device.

FIG. 2 is a schematic block diagram of an example computing device 200 that is may be used with one or more embodiments described herein, e.g., as any of the computing devices shown in FIG. 1, or any other computing device referenced below. The device 200 may also be any other suitable type of device depending upon the type of computing environment. As shown, device 200 comprises one or more network interface(s) 210, one or more processor(s) 220, and a memory 240 interconnected by a system bus 250 and powered by a power supply 260.

The network interface(s) 210 include the mechanical, electrical, and signaling circuitry for communicating data over physical and/or wireless links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interface(s) 210 for storing software programs and data structures associated with the embodiments described herein. The processor 220 may comprise necessary elements or logic adapted to execute the software programs and manipulate the data structures 245. An operating system 242, portions of which are typically resident in memory 240 and executed by the processor(s), functionally organizes the node by, among other things, invoking operations in support of software processes and/or services executing on the device. These software processes and/or services may comprise an illustrative functional process 244 and an illustrative AP (access point) proximity graphing process 248, as described herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, is while processes may be shown and/or described separately, those skilled in the art will appreciate that processes may be routines or modules within other processes, or may be functional operations of an operating system (e.g., executing processes/applications). Also, while functions are shown on a single device, operations may be shared among a plurality of devices, such as for distributed processing or cooperative processing, as will be appreciated by those skilled in the art.

Functional process(es) 244 may include computer executable instructions executed by processor 220 to perform one or more specific functions of the device 200, such as one or more applications, programs, protocols, etc., as will be understood by those skilled in the art. For example, depending upon the configuration of the device, functional process 244 may be configured to perform specific functions corresponding to that configuration, such as a networking device (e.g., access point, router, server, firewall, etc.) performing networking operations (e.g., access point operations, routing, server operations, firewall operations, etc.), IoT nodes performing their specifically configured IoT functions, a personal computer having specifically configured applications and associated functions, and so on.

In various embodiments, the techniques herein may utilize one or more machine learning techniques. In general, machine learning is concerned with the design and the development of techniques that take as input empirical data (such as network statistics and performance indicators), and recognize complex patterns in these data. Computational entities that rely on one or more machine learning techniques to perform a task for which they have not been explicitly programmed to perform are typically referred to as learning machines. In particular, learning machines are capable of adjusting their behavior to their environment. For example, a learning machine may dynamically make future predictions based on current or prior network measurements, may make control decisions based on the effects of prior control commands, etc.

In addition, anomaly detection attempts to identify patterns that do not conform to an expected behavior. Generally, anomaly detection typically presents a number of is challenges: 1.) a lack of a ground truth (e.g., examples of normal vs. abnormal behavior), 2.) being able to define a "normal" region in a highly dimensional space can be challenging, 3.) the dynamic nature of the problem due to changing network behaviors/anomalies, and 4.) differentiating between noise and relevant anomalies is not necessarily possible from a statistical standpoint, but typically also requires domain knowledge, among others. Anomalies may also take a number of forms: 1.) point anomalies (e.g., a specific data point is abnormal compared to other data points), 2.) contextual anomalies (e.g., a data point is abnormal in a specific context but not when taken individually), or 3.) collective anomalies (e.g., a collection of data points is abnormal with regards to an entire set of data points).

For purposes of anomaly detection in a network, a learning machine may construct a model of normal network behavior, to detect data points that deviate from this model. For example, a given model (e.g., a supervised, un-supervised, or semi-supervised model) may be used to generate and report anomaly scores to another device. Example machine learning techniques that may be used to construct and analyze such a model may include, but are not limited to, nearest neighbor (NN) techniques (e.g., k-NN models, replicator NN models, etc.), statistical techniques (e.g., Bayesian networks, etc.), clustering techniques (e.g., k-means, etc.), neural networks (e.g., reservoir networks, artificial neural networks, etc.), support vector machines (SVMs), or the like.

One class of machine learning techniques that is of particular use in the context of anomaly detection is clustering. Generally speaking, clustering is a family of techniques that seek to group data according to some typically predefined notion of similarity. Replicator techniques may also be used for purposes of anomaly detection. Such techniques generally attempt to replicate an input in an unsupervised manner by projecting the data into a smaller space (e.g., compressing the space, thus performing some dimensionality reduction) and then reconstructing the original input, with the objective of keeping the "normal" pattern in the low dimensional space. Still other techniques will be understood in the art, such as graph-based models for purposes of anomaly detection (e.g., attempting to represent the relationships between different is entities as a graph of nodes interconnected by edges, and detecting anomalous connections), and so on.

——Access Point Proximity Graphing——

As noted above, wireless roaming occurs when a client device (station) moves throughout an area with multiple APs and automatically switches between APs to maintain connectivity to the wireless network. The typical handoff process consists of three phases:

1. Scanning: As a device moves further away from the AP to which it is connected, the signal strength (RSSI) drops below acceptable levels, and the client device begins to send out probe packets to locate alternative APs for selection of a next AP based on certain criteria.
2. Authentication: The client device then sends an authentication request to the new AP and waits for an approval or rejection.
3. Re-association: Upon approval by the new AP, the client then sends a re-association request. Once the re-association is complete, the new AP completes the handoff by sending a disassociation message to the previous AP (e.g., in order to update routing tables and so on).

As also mentioned above, roaming paths in wireless networks are determined by the client station, based on detected APs during the scanning phase. Further, APs can influence this scanning phase by providing a shortlist of candidate channels to scan (in 802.11, using, for example, 802.11k neighbor report messages or 802.11v BSS Transition messages), based on the loudest neighboring signals (e.g., RSSIs) to build such a list.

However, the assumption that neighboring APs that are loudest, as seen from a given AP position (typically positioned at ceiling level) are also the best points to roam to for a client device (positioned near floor level, and with local constraints that are different from the "ceiling view" (e.g., furniture, walls, products on shelves, constrained paths to follow, etc.) renders this "loudest neighbors are best" system only partly efficient. In is many real life scenarios, the client ends up either associating to sub-optimal APs, or else scanning the "loudest neighbor" list, concluding that none of them are optimal roaming points, and then undergoing a full spectrum scan (thus wasting time).

Figure 3:
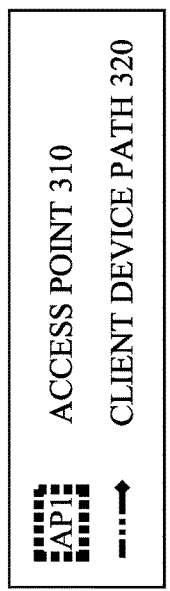
FIG. 3 illustrates an example floor plan and wireless network of access points.
Figure 3:
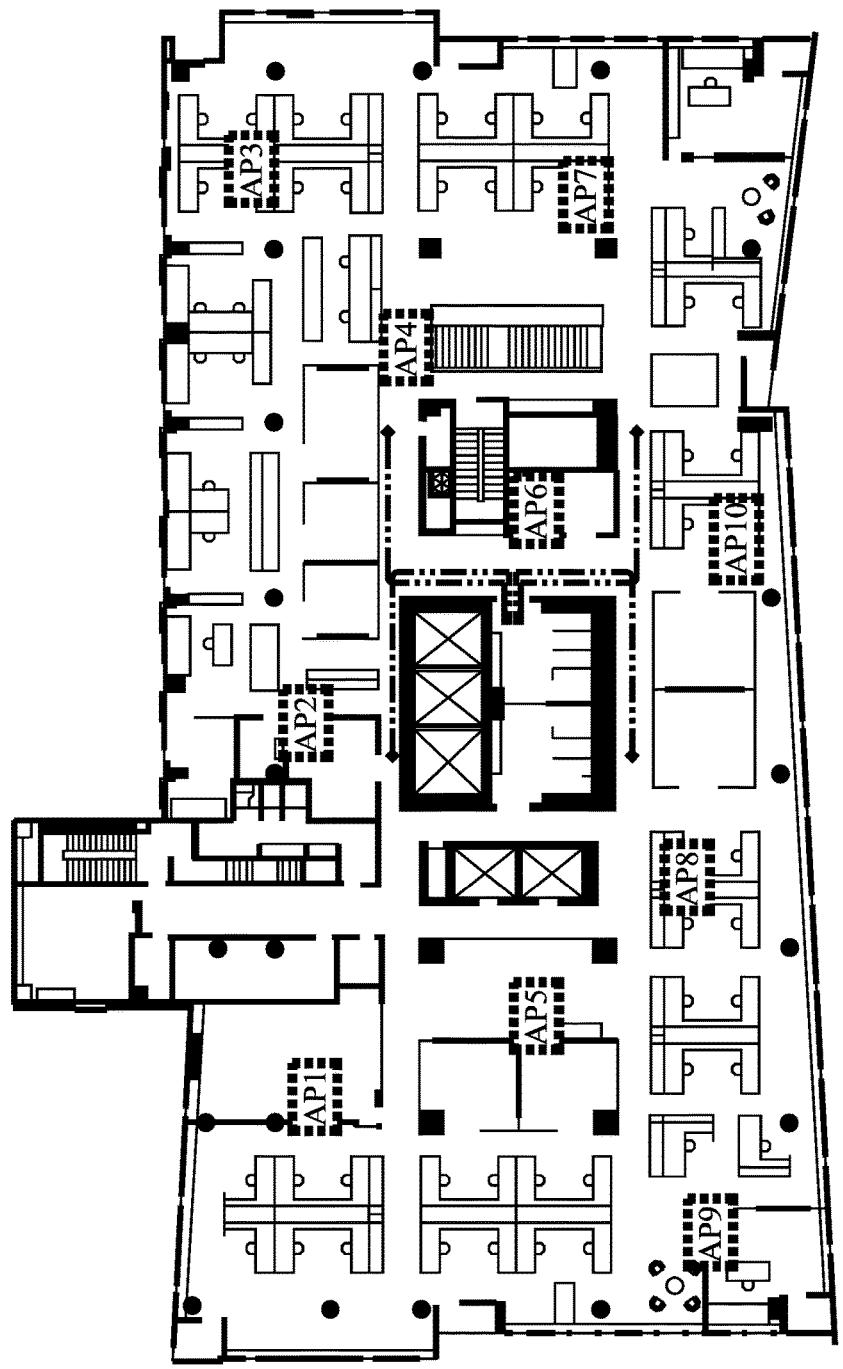

For example, FIG. 3 illustrates an example office floor plan 300, though any location such as a warehouse, a manufacturing floor, school building, medical facilities, hotels, and so on could equally be used as examples. As shown in the example floor plan, a wireless network is established through the installation of a plurality of access points (APs) 310, namely "AP1" through "AP10" in the example. Due to the typical path of client devices 320 (namely of the associated users coming from the elevators), after first associating with AP6, the client devices then typically head toward any one of the neighbors AP2, AP4, AP8, AP10, or AP7. However, according to conventional techniques, AP6 may decide that AP10 is its loudest neighbor, and thus may return a neighbor list to client devices consisting of AP10 only. In fact, in the example shown, AP6 may not even detect AP2 (elevator obstacle), AP8 (elevator obstacle), AP4 (stairwell obstacle), or AP7 (stairwell obstacle). Any client device that then attempts to join AP10 that does not actually head toward AP10, then, will need to locate a better AP with which to associate. As noted above, this additional scanning and re-association wastes valuable time and resources.

The techniques herein, therefore, provide for the construction of neighbor list that accounts for client roaming behavior (e.g., such that AP6 may return AP2, AP4, APB, AP10, and AP7 in the example above). Such an optimized construct can be returned to the client devices to optimize the scanning cycle. Said differently, the techniques herein construct a proximity list, e.g., using machine learning techniques, based on past client device roaming behavior, thus enhancing the reliability of the neighbor/proximity list provided. The techniques herein may also help determine outliers in order to help network designers identify challenging spots in the network, such as by comparing expected proximity (e.g., radio frequency or "RF" proximity) to what is referred to herein as "roaming proximity" (how often a client device roams to a particular AP) in order to detect such outliers and design issues.

Specifically, according to one or more embodiments of the disclosure as described in detail below, a process determines how often client devices roam from a given AP to each particular neighbor AP of a plurality of neighbor APs of the given AP, and correspondingly determines a roaming distance from the given AP to each particular neighbor AP, the roaming distance being shorter for neighbor APs roamed to more often, and longer for neighbor APs roamed to less often, within a given interval. Successful but temporary roams to the plurality of neighbor APs may also be detected and removed from consideration in the roaming distance to that particular neighbor AP. The process then generates a proximity list of one or more of the neighboring APs having the shortest roaming distances, and feeds the proximity list to the given AP to cause the given AP to provide the proximity list to client devices for optimized client roaming.

Illustratively, the techniques described herein may be performed by hardware, software, and/or firmware, such as in accordance with the AP proximity graphing process 248, which may include computer executable instructions executed by the processor 220 to perform functions relating to the techniques described herein, e.g., in conjunction with functional process 244 and/or with other processes of other devices (e.g., a distributed application of process 248 among a plurality of APs in the wireless network).

Figure 4:
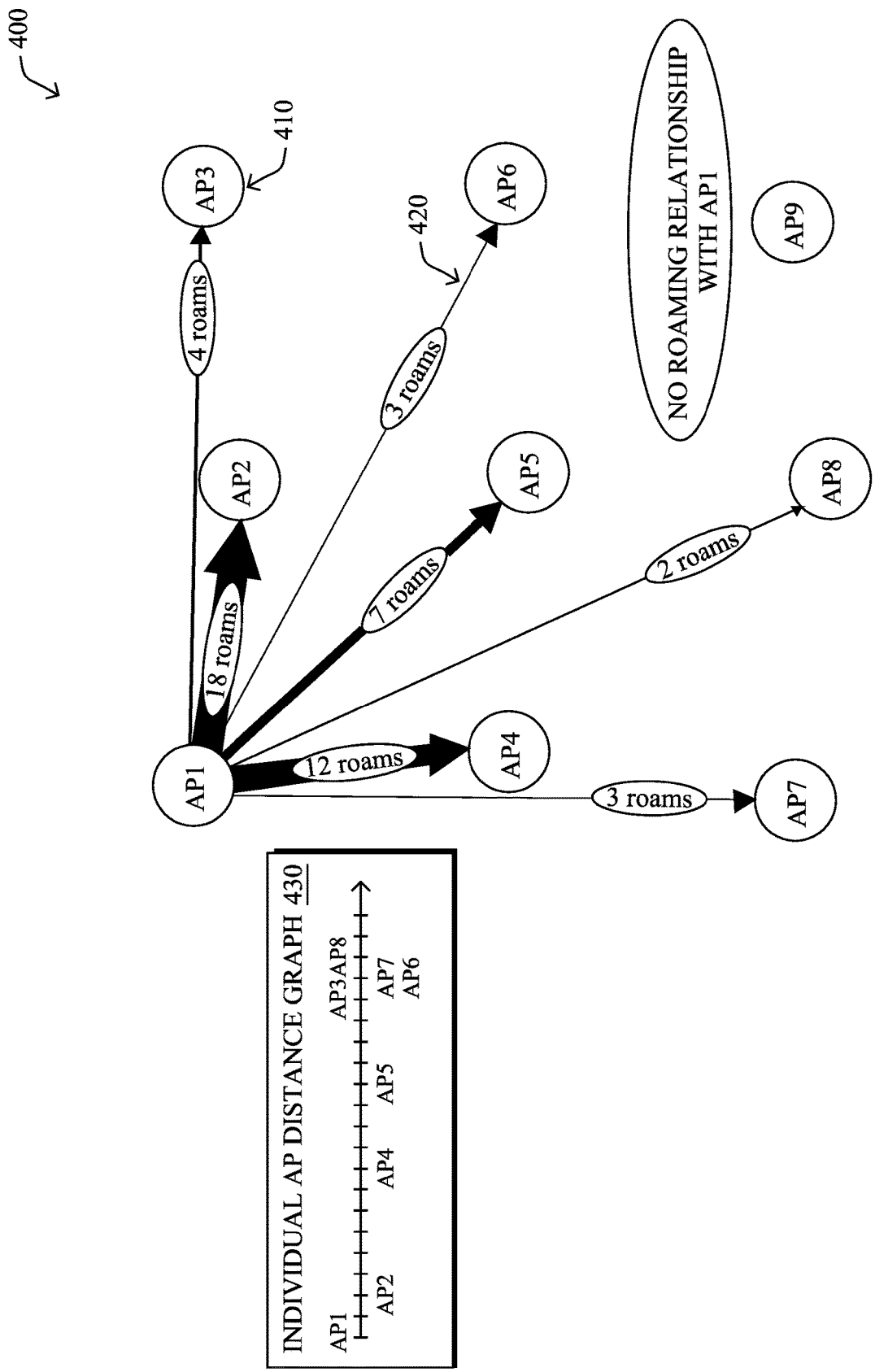
FIG. 4 illustrates an example roaming/proximity graph.

Operationally, and with reference generally to FIG. 4, a first aspect of the techniques herein is to generate a "roaming graph" 400, where each AP is represented as a vertex 410 and recorded client paths across APs as edges 420. The concept of "roaming distance" is introduced herein, where pairs of APs between which a higher number of clients roam directly are seen as closer than pairs of APs between which fewer clients roam directly. That is, roaming density (how often client devices roam from a given AP, in this case AN, to neighboring APs) is converted to a roaming distance, where more roams over a certain interval equals a shorter distance between the AP pair (e.g., an inverse relationship: such as distance=1/density). A linear graphical representation for roaming distances from a given AP (e.g., AP1) to its neighbors is also shown in roaming distance graph 430. Note that the graphs are directed (as AP1 to AP2 distance may be different from AP2 to AP1 distance, for example, if more devices roam is from AP1 to AP2 than devices roam from AP2 to AP1), thus each AP will have its own associated graph and associated roaming distances.

As noted, roaming is the action of an already existing wireless client to successfully complete an association exchange with a new AP (after leaving the previous AP). However, clients do not always choose the best AP, and such an exchange is not always reflective of a stable connection. It is common to observe a behavior where the client temporarily associates to an AP only for a short time (e.g., a second or less), in an attempt to find a better connection point, then jumps to another, better AP. Such "successful but wrong" (or "successful but temporary") roaming attempts are detected by the techniques herein, and removed from consideration of the roaming distance computed above. For example, for each AP, the techniques herein may compute a "dwelling duration" of each client on each AP. Several techniques can be used to detect "successful but wrong" roaming attempts, such as by plotting the dwelling time on a normal distribution graph, then identifying the outliers on the lower part of the graph. These outliers can then be isolated and their temporal roaming is removed from the roaming graph above.

According to the techniques herein, the roaming distances (e.g., graph 400) may then be used to extract a proximity list. This particular component of the techniques herein computes, for each AP in the wireless network, a new list of closest neighbors for each AP based on client roaming behavior (i.e., those with the "shortest" roaming distance). For instance, the proximity list may comprise the top 'n' neighbor list (e.g., the community of n APs around a given AP to which clients are most likely to roam, irrespective of their RF distance), where n can be set manually, determined dynamically, adaptive based on various factors (e.g., AP load), and so on. For example, the proximity list for the AP1 graph 400 in FIG. 4 may comprise AP2 (n=1), then AP4 (n=2), then AP5 (n=3), AP3 (n=4), and so on. Generally, it can be seen that AP2 and AP4 are the best two options, followed by AP5, while AP3, AP6, AP7, and AP8 are trailing. As such, a likely outcome would be either n=2 or n=3, if computed dynamically in this instance. Alternatively, n could simply be set to all APs available for roaming, such than only AP9 remains off the list. (Note that larger sets of APs may be left off the list in this scenario, such as APs on other floors or far enough away to never be a practical roaming option for a client device, and the fact that only one would be left off in the example is merely an example for illustration of APs with no associated roaming distance.)

A corresponding proximity list may then be provided to (or computed by) each AP, so that each AP can provide a better neighbor/proximity list to each client device, thus optimizing client roaming behavior.

It is important to point out that in one or more embodiments herein, the proximity list can be based on certain time periods or other "seasonality". For example, the roaming distances computed above may be associated with certain times of day, days of the week, seasons of the year, and so on, and as such, the resultant proximity list would share the time-relevant results. For instance, imagine different client device path patterns, such as whether the client devices are commuting into an office in the morning (e.g., heading toward a desk) versus commuting out at the end of the day (e.g., heading toward the front door), or other factors, such as users heading toward the coffee maker in the morning when they arrive through the front door, versus heading straight to their desks when returning through the front door after lunch. Any other observations may be made according to time-based seasonality of device behavior, and by matching the time parameters of the proximity list to the time parameters of when the list is being fed can further optimize the techniques herein.

Figure 5:
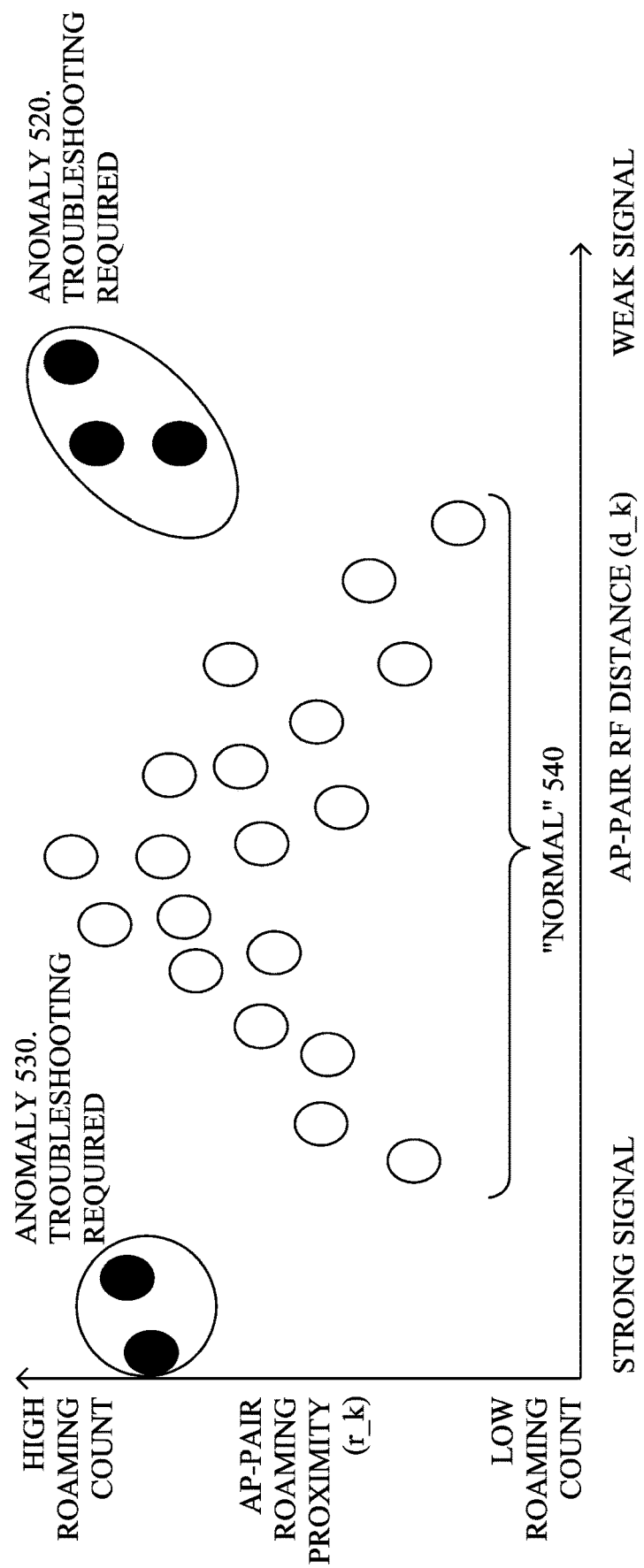
FIG. 5 illustrates an example graph plotting radio frequency distance to roaming distance.

According to the techniques herein, the information obtained above may further be used beneficially to make observations and corrections for network design. For instance, in one embodiment, and with reference generally to FIG. 5, a geometric mean graph 500 may be constructed (e.g., AP RSSI distance, RSSI signal over roaming proximity geometric mean), and then the graph may be observed in order to detect outliers among the plotted points 510. These outliers, for example, may represent relationships between APs that have either a strong RSSI signal but very high roaming distance (two APs are very close, but few clients roam between them), or APs that have a is weak RSSI, but many roaming users.

Example calculation and detection methods are as follows. In particular, for a given collection of APs (typically a floor or a building, and any collection of APs in range of one another and supporting a given SSID), the techniques herein may compute the number of roams between pairs of APs, eliminating all pairs that have no roams between them, as described above. The remaining (non-zero) roamed pairs may be mapped into a set (1,K) where K is the total number of AP pairs with non-zero roams. For each pair k we have the following:

1) $r\_k$=number of successful roams for pair k over a cumulative interval as described above; and
2) $d\_k$=RF distance between APs in pair k (averaged RF distance based on RSSI measurements).

Accordingly, one would expect to observe the following:
if $d\_k$ is very low, then $r\_k$ should be low. Clients should not be roaming between APs that are very close apart because clients should not have needed to hand over because of relatively strong signal from the serving/source AP;
if $d\_k$ is low then $r\_k$ should be high. Clients should roam between APs in range of one another, and relatively close to one another.
if $d\_k$ is very high then $r\_k$ should be low. Clients should not be roaming between APs that are far apart because it is likely clients had low coverage before it handed over.

A-priori, however, we don't know what are "high" values of $\{d\_k\}$ and $\{r\_k\}$. The techniques herein, therefore, formulate this as an anomaly detection problem where the above two "$d\_k$ very high or very low" scenarios are surfaced as anomalies. For instance, one possible technique to solve this problem is through clustering and DBscan. That is, DBscan clusters AP-Pairs (Large Distance, High Roam), (Small Distance, High Roam) into separate clusters (520 and 530, respectively), where these clusters are anomalous, is and the remaining pairs are characterized into a "normal" cluster 540. Alternatively, another techniques is to plotting the density of roam counts as a function of distance. That is, since it is expected to monotonically increase with distance and then start decreasing after some "optimal" distance, the anomalous cases may be visually surfaced for examination by a network administrator, as they are typically indicative of RF design anomalies that may require local action (e.g., moving APs, adding or removing APs, changing power patterns, etc.).

Figure 6:
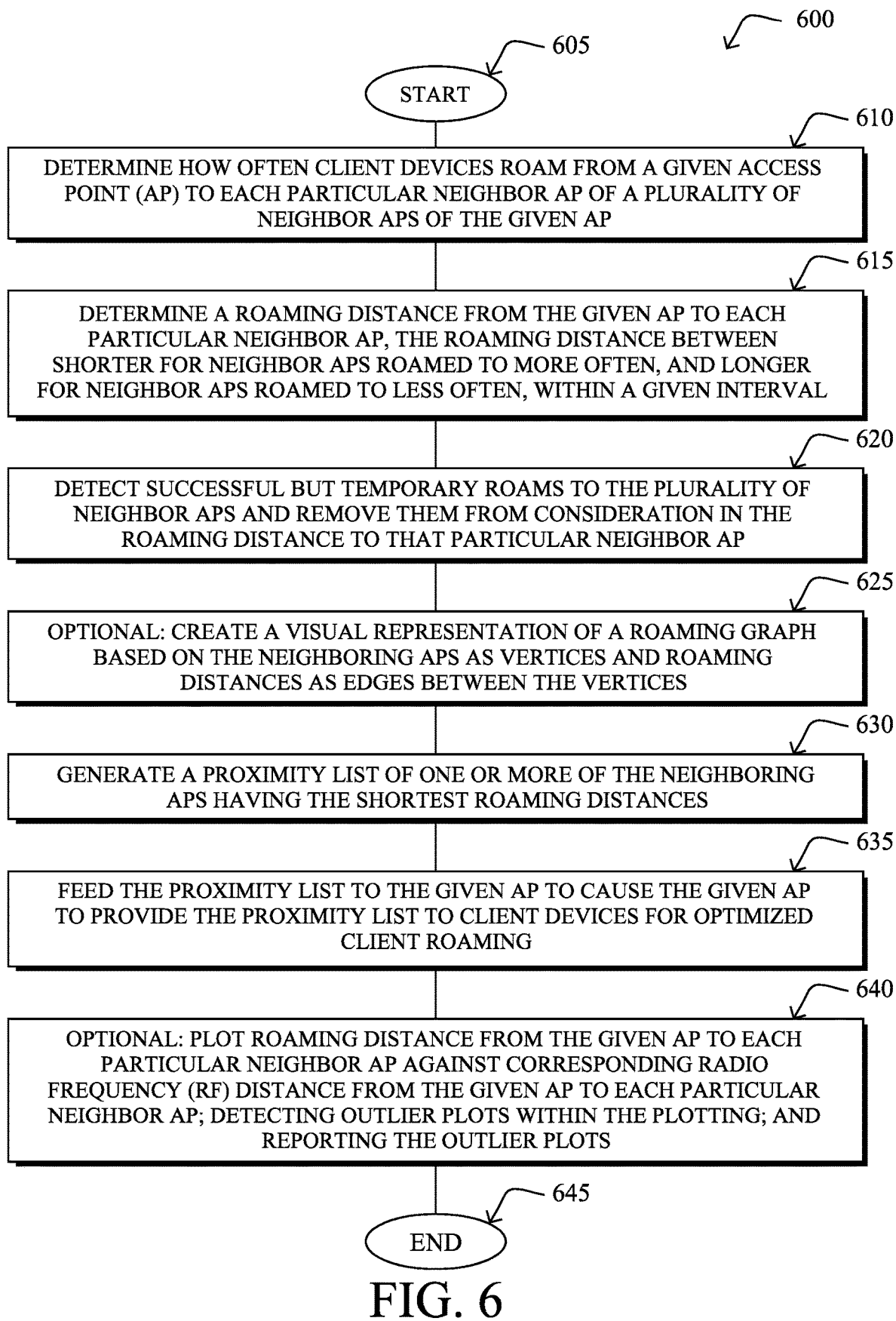
FIG. 6 illustrates an example simplified procedure for access point proximity graphing.

FIG. 6 illustrates an example simplified procedure for access point proximity graphing in accordance with one or more embodiments described herein. For example, a non-generic, specifically configured device (e.g., device 200, such as a server, AP, or plurality of APs) may perform procedure 600 by executing stored instructions (e.g., process 248, whether on a single device or else a distributed process configured cooperatively across a plurality of devices/APs). The procedure 600 may start at step 605, and continues to step 610, where, as described in greater detail above, the process determines how often client devices roam from a given AP to each particular neighbor AP of a plurality of neighbor APs of the given AP. As noted above, the given AP and the plurality of neighbor APs (APs 310) may be located on a ceiling of a location, and the client devices 320 may be located near a floor of the location, though any arrangement may be possible (including APs on the floor for devices on a ceiling or in the air, or any suitable configuration).

In step 615, the techniques herein may then determine a roaming distance from the given AP to each particular neighbor AP, where, as described above, the roaming distance is shorter for neighbor APs roamed to more often, and longer for neighbor APs roamed to less often (within a given interval, e.g., since inception, in the last hour, day, month, year, etc.). Note that in order to more accurately represent optimal characteristics, the techniques herein, in step 620, may detect successful but temporary roams to the plurality of neighbor APs, and removes such temporary roams from consideration in the roaming distance to that particular neighbor AP. For instance, as noted above, step 620 is may compute dwelling durations for how long client devices stay at a new AP after roaming to the new AP, and can determine outlier dwelling durations that are substantially shorter than other dwelling durations, where roams associated with the outlier dwelling durations are classified as successful but temporary roams (and may be removed as a roam considered in the roaming distance computation).

Optionally, in step 625, a visual representation of a roaming graph may be created at this point (e.g., graph 400), such as based on the neighboring APs being vertices and roaming distances as edges between the vertices (i.e., between the given AP and the neighboring APs—recall that such roaming distances/edges are directional).

According to the techniques herein, in step 630 a proximity list of one or more of the neighboring APs having the shortest roaming distances may be generated. "Shortest", as defined herein, may mean the one best, a plurality of best (e.g., a cluster of similar "short" roaming distances), a plurality under a certain threshold, and so on. In other words, static policies may be defined for what would be considered the "shortest roaming distances", or else various machine learning techniques may be used to adaptively delineate which particular neighbor APs to include in various situations and at various times (e.g., where the proximity list corresponds to a particular time period, as noted above). Note that one or more of the plurality of neighbor APs may have no associated roaming distance (e.g., in response to no roams occurring from the given AP to those APs) and are thus not included in the proximity list (and have an unconnected status in the roaming graph or else an infinite or otherwise substantially higher roaming distance).

In step 635, the techniques herein then feed the proximity list to the given AP to cause the given AP to provide the proximity list to client devices for optimized client roaming.

Optionally, in certain embodiments, the techniques herein may also plot roaming distance from the given AP to each particular neighbor AP against the corresponding RF distance (e.g., RSSI) in step 640, thereby allowing for the detection of (and reporting of) outlier plots within the plotting, as described above. For instance, detecting outlier plots may be based on anomaly detection applied to clusters of plots, such as where outlier is plots consist of one or both of either a) plots showing a strong RF distance and high roaming distance, or b) plots showing a weak RF distance and high roaming distance, as shown with reference to FIG. 5 above.

The simplified procedure 600 may then end in step 645, notably with the ability to continue updating the roaming distances and proximity list over time. For example, if patterns change, APs change, new obstacles appear in the space, etc., the techniques herein may dynamically adapt to the changes and provide updated proximity lists, accordingly.

It should be noted that while certain steps within procedure 600 may be optional as described above, the steps shown in FIG. 6 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide for access point proximity graphing, which greatly assists in optimizing the handoff process for client devices roaming between APs in a wireless computer network. In particular, the techniques herein move past the assumption that the loudest neighboring APs (e.g., from the ceiling view perspective) are the best for directing client device roaming, and instead attempts to create the best "floor view" of an area in order to prevent client devices from associating to sub-optimal APs, and still without undergoing a full spectrum scan. That is, the techniques herein construct reliable neighbor lists, based on an AP-view of the network (i.e., does not require client device feedback), while still accounting for actual client roaming behavior. These lists can be used for devices newly entering the location of the network, as well, since the lists are based on learning the typical roaming characteristics of the location/floor. Furthermore, the techniques herein can detect outliers or other issues, such as anomalies when comparing RF proximity to roaming proximity, thus identifying challenging spots in particular network locations.

While there have been shown and described illustrative embodiments that provide for access point proximity graphing, it is to be understood that various other adaptations and modifications may be made within the spirit and scope of the embodiments herein. For example, while certain embodiments are described herein with respect to using certain models for purposes of anomaly detection, the models are not limited as such and may be used for other functions, in other embodiments. In addition, while certain protocols are shown, such as IEEE 802.11, or particular measures of quality or signal strength (e.g., RSSI), other suitable protocols and measures may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   determining, by a server, how often client devices roam from a given access point (AP) to each particular neighbor AP of a plurality of neighbor APs of the given AP;
   determining, by the server, a roaming distance from the given AP to each particular neighbor AP, the roaming distance being shorter for neighbor APs roamed to more often, and longer for neighbor APs roamed to less often, within a given interval;

detecting, by the server, successful but temporary roams to the plurality of neighbor APs, wherein the temporary roams are roams to the plurality of neighbors that last less than a predefined time interval;

removing, by the server, temporary roams to each particular neighbor AP from consideration in the roaming distance to that particular neighbor AP;

generating, by the server, a proximity list of one or more of the neighboring APs having the shortest roaming distances; and feeding, by the server, the proximity list to the given AP to cause the given AP to provide the proximity list to client devices for optimized client roaming.

2. The method as in claim 1, further comprising:
creating a visual representation of a roaming graph based on the neighboring APs as vertices and roaming distances as edges between the vertices.

3. The method as in claim 1, wherein detecting successful but temporary roams comprises:
computing dwelling durations for how long client devices stay at a new AP after roaming to the new AP; and
determining outlier dwelling durations that are substantially shorter than other dwelling durations, wherein roams associated with the outlier dwelling durations are classified as successful but temporary roams.

4. The method as in claim 1, further comprising:
plotting roaming distance from the given AP to each particular neighbor AP against corresponding radio frequency (RF) distance from the given AP to each particular neighbor AP;
detecting outlier plots within the plotting, wherein outlier plots are one or more roaming distance plots that are outside a graph constructed by the plotting; and
reporting the outlier plots.

5. The method as in claim 4, wherein detecting outlier plots is based on anomaly detection applied to clusters of plots.

6. The method as in claim 4, wherein RF distance is based on receive signal strength indication (RSSI).

7. The method as in claim 4, wherein outlier plots indicate anomalies in RF distance and roaming distance in comparison to a typical plot of RF distance and roaming distance on the graph.

8. The method as in claim 1, wherein one or more of the plurality of neighbor APs have no associated roaming distance and are not included in the proximity list in response to no roams occurring from the given AP to those one or more of the plurality of neighbor APs.

9. The method as in claim 1, wherein the given AP and the plurality of neighbor APs are located on a ceiling of a location, and wherein the client devices are located near a floor of the location.

10. The method as in claim 1, wherein the server comprises a distributed server process configured cooperatively on the given AP and the plurality of neighbor APs.

11. The method as in claim 1, wherein the proximity list corresponds to a particular time period.

12. A tangible, non-transitory, computer-readable medium storing program instructions that cause a computer to execute a process, comprising:
determining how often client devices roam from a given access point (AP) to each particular neighbor AP of a plurality of neighbor APs of the given AP;
determining a roaming distance from the given AP to each particular neighbor AP, the roaming distance being shorter for neighbor APs roamed to more often, and longer for neighbor APs roamed to less often, within a given interval;
detecting successful but temporary roams to the plurality of neighbor APs, wherein the temporary roams are roams to the plurality of neighbors that last less than a predefined time interval;
removing temporary roams to each particular neighbor AP from consideration in the roaming distance to that particular neighbor AP;
generating a proximity list of one or more of the neighboring APs having the shortest roaming distances; and
feeding the proximity list to the given AP to cause the given AP to provide the proximity list to client devices for optimized client roaming.

13. The computer-readable medium as in claim 12, the process further comprising:
creating a visual representation of a roaming graph based on the neighboring APs as vertices and roaming distances as edges between the vertices.

14. The computer-readable medium as in claim 12, wherein detecting successful but temporary roams comprises:
computing dwelling durations for how long client devices stay at a new AP after roaming to the new AP; and
determining outlier dwelling durations that are substantially shorter than other dwelling durations, wherein roams associated with the outlier dwelling durations are classified as successful but temporary roams.

15. The computer-readable medium as in claim 12, the process further comprising:
plotting roaming distance from the given AP to each particular neighbor AP against corresponding radio frequency (RF) distance from the given AP to each particular neighbor AP;
detecting outlier plots within the plotting, wherein outlier plots are one or more roaming distance plots that are outside a graph constructed by the plotting; and
reporting the outlier plots.

16. The computer-readable medium as in claim 12, wherein one or more of the plurality of neighbor APs have no associated roaming distance and are not included in the proximity list in response to no roams occurring from the given AP to those one or more of the plurality of neighbor APs.

17. The computer-readable medium as in claim 12, wherein the given AP and the plurality of neighbor APs are located on a ceiling of a location, and wherein the client devices are located near a floor of the location.

18. The computer-readable medium as in claim 12, wherein the process comprises a distributed server process configured cooperatively on the given AP and the plurality of neighbor APs.

19. The computer-readable medium as in claim 12, wherein the proximity list corresponds to a particular time period.

20. An apparatus, comprising:
a processor configured to execute one or more process; and
a memory configured to store a process executable by the processor, the process when executed configured to:
determine how often client devices roam from a given access point (AP) to each particular neighbor AP of a plurality of neighbor APs of the given AP;
determine a roaming distance from the given AP to each particular neighbor AP, the roaming distance being shorter for neighbor APs roamed to more often, and longer for neighbor APs roamed to less often, within a given interval;

detect successful but temporary roams to the plurality of neighbor APs, wherein the temporary roams are roams to the plurality of neighbors that last less than a predefined time interval;

remove temporary roams to each particular neighbor AP from consideration in the roaming distance to that particular neighbor AP;

generate a proximity list of one or more of the neighboring APs having the shortest roaming distances; and feed the proximity list to the given AP to cause the given AP to provide the proximity list to client devices for optimized client roaming.

\* \* \* \* \*

UNITED STATES PATENT AND TRADEMARK OFFICE
CERTIFICATE OF CORRECTION

PATENT NO. : 10,595,295 B2
APPLICATION NO. : 16/024377
DATED : March 17, 2020
INVENTOR(S) : Jerome Henry et al.

Page 1 of 2

It is certified that error appears in the above-identified patent and that said Letters Patent is hereby corrected as shown below:

In the Specification

Column 1, Line 25, please amend as shown:
nels to scan. However, APs using traditional methods rely Column 3, Line 5, please amend as shown:
computing device 20 that may be used with one or more Column 3, Line 47, please amend as shown:
ality of a similar process). Further, while processes may be Column 4, Line 21, please amend as shown:
anomaly detection typically presents a number of chal- Column 4, Line 65, please amend as shown:
the relationships between different entities as a graph of Column 5, Line 36, please amend as shown:
only partly efficient. In many real life scenarios, the client Column 5, Line 65, please amend as shown:
ior (e.g., such that AP6 may return AP2, AP4, AP8, AP10

Column 6, Line 45, please amend as shown:
often client devices roam from a given AP, in this case AP1, Column 6, Line 54, please amend as shown:
devices roam from AP1 to AP2 than devices roam from Signed and Sealed this
Seventh Day of July, 2020

Andrei Iancu
*Director of the United States Patent and Trademark Office*

CERTIFICATE OF CORRECTION (continued)
U.S. Pat. No. 10,595,295 B2

Column 8, Line 2, please amend as shown:
roam between them), or APs that have a weak RSSI, but Column 8, Line 39, please amend as shown:
respectively), where these clusters are anomalous, and the Column 9, Line 12, please amend as shown:
neighbor AP. For instance, as noted above, step 620 may Column 9, Line 54, please amend as shown:
of plots, such as where outlier plots consist of one or both Column 8, Line 2, please amend as shown:
roam between them), or APs that have a weak RSSI, but